United States Patent
Shin et al.

(10) Patent No.: US 9,837,218 B2
(45) Date of Patent: Dec. 5, 2017

(54) COMPOSITE ELECTRONIC COMPONENT AND MANUFACTURING METHOD THEREOF

(71) Applicant: SAMSUNG ELECTRO-MECHANICS CO., LTD., Suwon-Si, Gyeonggi-Do (KR)

(72) Inventors: Hong Kyu Shin, Suwon-Si (KR); Wan Suk Yang, Suwon-Si (KR); Hyun Sub Oh, Suwon-Si (KR); Hyoung Sun Ham, Suwon-Si (KR); Jae Hyuk Choi, Suwon-Si (KR)

(73) Assignee: Samsung Electro-Mechanics Co., Ltd., Suwon-si, Gyeonggi-do (KR)

( * ) Notice: Subject to any disclaimer, the term of this patent is extended or adjusted under 35 U.S.C. 154(b) by 86 days.

(21) Appl. No.: 14/875,373

(22) Filed: Oct. 5, 2015

(65) Prior Publication Data
US 2016/0172125 A1     Jun. 16, 2016

(30) Foreign Application Priority Data
Dec. 16, 2014 (KR) .................. 10-2014-0181367

(51) Int. Cl.
| | |
|---|---|
| *H01G 15/00* | (2013.01) |
| *H01G 4/30* | (2006.01) |
| *H01G 9/15* | (2006.01) |
| *H01G 4/12* | (2006.01) |
| *H01G 9/052* | (2006.01) |

(52) U.S. Cl.
CPC .............. *H01G 15/00* (2013.01); *H01G 4/12* (2013.01); *H01G 4/30* (2013.01); *H01G 9/052* (2013.01); *H01G 9/15* (2013.01)

(58) Field of Classification Search
CPC .......... H01G 15/00; H01G 9/15; H01G 9/052; H01G 4/12; H01G 4/30
See application file for complete search history.

(56) References Cited

U.S. PATENT DOCUMENTS

| | | | |
|---|---|---|---|
| 2007/0002517 | A1 | 1/2007 | Nakamura |
| 2007/0211414 | A1* | 9/2007 | Pelcak ............... H01G 9/012 361/541 |
| 2008/0019081 | A1* | 1/2008 | Kim .................. H01G 2/06 361/535 |
| 2010/0188798 | A1 | 7/2010 | Togashi et al. |
| 2013/0058002 | A1* | 3/2013 | Oh .................... H01G 4/30 361/301.4 |

FOREIGN PATENT DOCUMENTS

| | | | |
|---|---|---|---|
| JP | 01073610 A | * | 3/1989 |
| JP | 01109711 A | * | 4/1989 |
| JP | 9-232196 A | | 9/1997 |

(Continued)

*Primary Examiner* — David M Sinclair
(74) *Attorney, Agent, or Firm* — McDermott Will & Emery LLP (57) ABSTRACT

A composite electronic component includes: a tantalum capacitor, a multilayer ceramic capacitor, a sealing part, an anode lead frame, and a cathode lead frame, wherein the anode lead frame includes a step portion that does not contact a first external electrode of the multilayer ceramic capacitor, and the cathode lead frame includes a step portion that does not contact a second external electrode of the multilayer ceramic capacitor.

7 Claims, 7 Drawing Sheets

(56) References Cited

FOREIGN PATENT DOCUMENTS

| | | | | |
|---|---|---|---|---|
| JP | 09232196 | A | * | 9/1997 |
| JP | 9-326334 | A | | 12/1997 |
| JP | 2001332446 | A | * | 11/2001 |
| JP | 2003234246 | A | * | 8/2003 |
| JP | 2006-351807 | A | | 12/2006 |
| JP | 2007043197 | A | * | 2/2007 |
| KR | 2010-0087622 | A | | 8/2010 |

* cited by examiner

COMPOSITE ELECTRONIC COMPONENT AND MANUFACTURING METHOD THEREOF

CROSS-REFERENCE TO RELATED APPLICATION

This application claims the priority and benefit of Korean Patent Application No. 10-2014-0181367 filed on Dec. 16, 2014, with the Korean Intellectual Property Office, the disclosure of which is incorporated herein by reference.

BACKGROUND

The present disclosure relates to a composite electronic component and a manufacturing method thereof.

A multilayer ceramic capacitor, a multilayer electronic component, is mounted on printed circuit boards of various electronic products such as display devices including liquid crystal displays (LCDs), plasma display panels (PDPs), and the like, computers, smart phones, mobile phones, and the like to thereby serve to charge or discharge electricity.

The above-mentioned multilayer ceramic capacitor (MLCC) may be used as a component of various electronic devices due to advantages such as a small size, high capacitance, and ease of mounting.

The multilayer ceramic capacitor may have a structure in which a plurality of dielectric layers and internal electrodes disposed between the dielectric layers and having different polarities are alternately stacked.

Since the dielectric layer as described above has piezoelectricity and electrostriction, when direct current (DC) voltage or alternating current (AC) voltage is applied to the multilayer ceramic capacitor, a piezoelectric phenomenon may be generated between the internal electrodes, thereby generating vibrations.

These vibrations are transferred to a printed circuit board on which the multilayer ceramic capacitor is mounted through solders of the multilayer ceramic capacitor, and thus an entire printed circuit board becomes an acoustic reflective surface generating vibrations as noise. The vibration sound may have a frequency corresponding to an audio frequency range of 20 Hz to 20,000 Hz potentially causing user discomfort. The vibration noise causing listener discomfort as described above is referred to as acoustic noise.

In order to decrease acoustic noise, research into a product in which thickness of a lower cover layer of the multilayer ceramic capacitor is increased has been conducted. However, research into a product having a greater effect of decreasing acoustic noise has been further required.

Further, various methods such as a method of changing a structure and materials of the capacitor, or the like, have been attempted in order to improve electrical properties such as equivalent series resistance (ESR), equivalent series inductance (ESL), and the like.

SUMMARY

An aspect of the present disclosure may provide a composite electronic component having significantly decreased acoustic noise and having low equivalent series resistance (ESR)/equivalent series inductance (ESL), improved DC-bias characteristics, and reduced thickness.

According to an aspect of the present disclosure, a composite electronic component may include: a tantalum capacitor including a tantalum body containing sintered tantalum powder and a tantalum wire disposed on one surface of the tantalum body; a multilayer ceramic capacitor including a ceramic body in which a plurality of dielectric layers and internal electrodes are alternately disposed, and first and second external electrodes disposed on outer surfaces of the ceramic body; a sealing part enclosing the tantalum capacitor and the multilayer ceramic capacitor; an anode lead frame connected to the tantalum wire of the tantalum capacitor and the first external electrode of the multilayer ceramic capacitor, and exposed to the outside of the sealing part; and a cathode lead frame connected to the tantalum body of the tantalum capacitor and the second external electrode of the multilayer ceramic capacitor, and exposed to the outside of the sealing part. The anode lead frame may include a step portion that does not contact the first external electrode of the multilayer ceramic capacitor, and the cathode lead frame may include a step portion that does not contact the second external electrode of the multilayer ceramic capacitor.

According to another aspect of the present disclosure, a method of manufacturing a composite electronic component may include: preparing a conductive thin film (S1); forming an anode electrode plate of an anode lead frame and a cathode lead frame by cutting and compressing the conductive thin film (S2); forming a step portion on the anode electrode plate of the anode lead frame, and forming a step portion on the cathode lead frame (S3); forming a connection portion on the anode electrode plate of the anode lead frame (S4); mounting a tantalum capacitor including a tantalum wire which is disposed on one surface of a tantalum body and a multilayer ceramic capacitor including first and second external electrodes on the anode and cathode lead frames (S5); and forming a sealing part to enclose the tantalum capacitor and the multilayer ceramic capacitor while externally exposing one surfaces of the anode lead frame and the cathode lead frame (S6).

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity.

Directions of a hexahedron will be defined in order to clearly describe exemplary embodiments. "L," "W," and "T" illustrated in the accompanying drawings refer to a length direction, a width direction, and a thickness direction, respectively.

Composite Electronic Component

Figure 1:
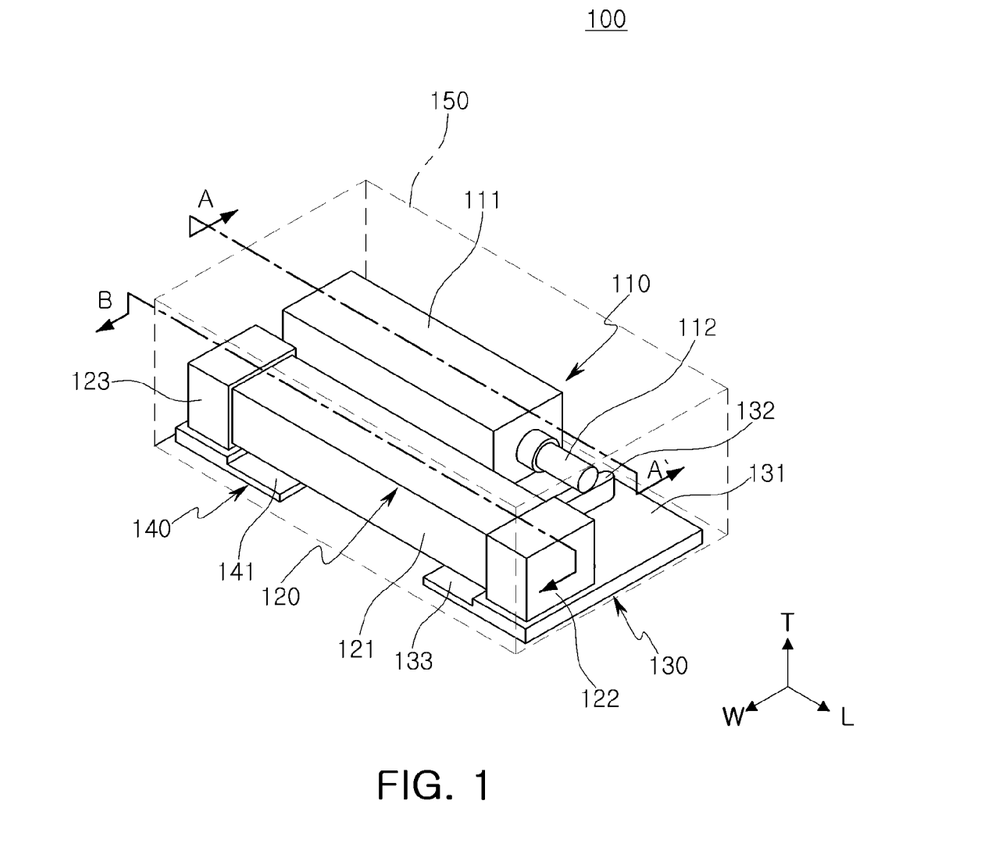
FIG. 1 is a perspective view of a composite electronic component according to an exemplary embodiment in the present disclosure of which a sealing part is transparently illustrated.
Figure 2:
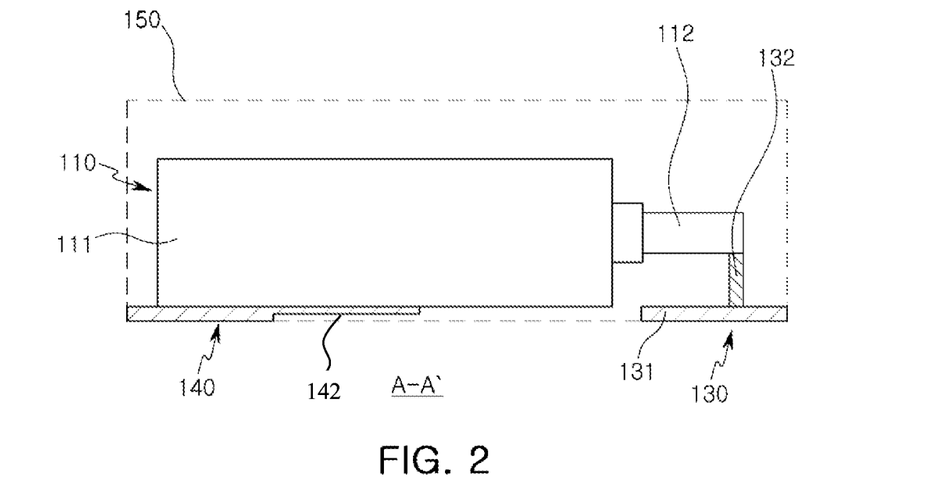
FIG. 2 is a cross-sectional view taken along line A-A' of FIG. 1.
Figure 3:
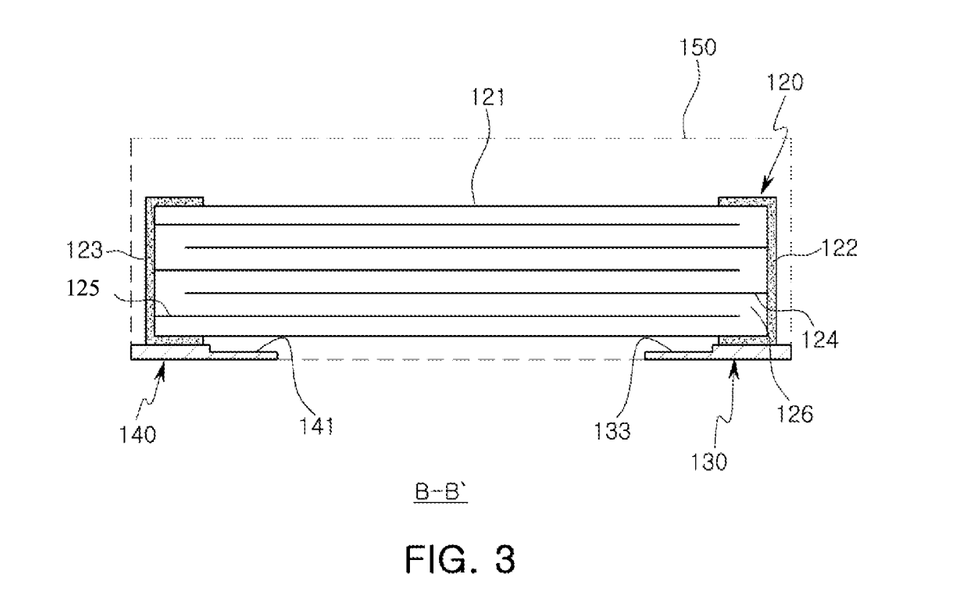
FIG. 3 is a cross-sectional view taken along line B-B' of FIG. 1.

FIG. 1 is a perspective view of a composite electronic component according to an exemplary embodiment in the present disclosure of which a sealing part is transparently illustrated, FIG. 2 is a cross-sectional view taken along line A-A' of FIG. 1, and FIG. 3 is a cross-sectional view taken along line B-B' of FIG. 1.

Referring to FIGS. 1 through 3, a composite electronic component 100, according to the present exemplary embodiment, may include: a tantalum capacitor 110 including a tantalum body 111 containing sintered tantalum powder and a tantalum wire 112 disposed on one surface of the tantalum body 111; a multilayer ceramic capacitor 120 including a ceramic body 121 in which a plurality of dielectric layers 126 and internal electrodes 124 and 125 are alternately disposed, and first and second external electrodes 122 and 123 disposed on outer surfaces of the ceramic body 121; a sealing part 150 enclosing the tantalum capacitor 110 and the multilayer ceramic capacitor 120; an anode lead frame 130 connected to the tantalum wire 112 of the tantalum capacitor 110 and the first external electrode 122 of the multilayer ceramic capacitor 120, and exposed to the outside of the sealing part 150; and a cathode lead frame 140 connected to the tantalum body 111 of the tantalum capacitor 110 and the second external electrode 123 of the multilayer ceramic capacitor 120, and exposed to the outside of the sealing part 150. The anode lead frame 130 may include a step portion 133 that does not contact the first external electrode 122 of the multilayer ceramic capacitor 120, and the cathode lead frame 140 may include a step portion 141 that does not contact the second external electrode 123 of the multilayer ceramic capacitor 120. The cathode lead frame 140 may further include another step portion 142 formed in a surface opposite to a mounted surface of the multilayer ceramic capacitor 120. The other step portion 142 and the tantalum body 111 may overlap with each other.

According to the exemplary embodiment, the composite electronic component 100 may include the tantalum capacitor 110 and the multilayer ceramic capacitor 120, and thus the composite electronic component 100 may significantly decrease acoustic noise and have low equivalent series resistance (ESR)/equivalent series inductance (ESL), improved DC-bias characteristics, and reduced thickness.

According to the exemplary embodiment the tantalum capacitor 110 and the multilayer ceramic capacitor 120 may be connected to an external power source by the anode lead frame 130 and the cathode lead frame 140, and do not include separate lead frames.

Since a general tantalum capacitor is connected to the external power source by a lead frame, a region occupied by the lead frame in the tantalum capacitor 110 is large, and thus there is a limitation in increasing capacitance of the tantalum capacitor. According to the exemplary embodiment, high capacitance may be implemented and the composite electronic component 100 in which a plurality of multilayer ceramic capacitors 120 are coupled to each other may be easily implemented by using the tantalum capacitor 110 that does not include the lead frame.

In general, the tantalum capacitor may implement high capacitance and have excellent DC-bias characteristics, and acoustic noise is not generated when the tantalum capacitor is mounted on a circuit board. On the contrary, there is a problem in that equivalent series resistance (ESR) may be high. Generally, a multilayer ceramic capacitor has low equivalent series resistance (ESR) and equivalent series inductance (ESL). Conversely, DC-bias characteristics of the multilayer ceramic capacitor may not be as optimal as compared to the tantalum capacitor, and it may be difficult to implement high capacitance. In addition, thickness of the multilayer ceramic capacitor may be significant, and when the multilayer ceramic capacitor is mounted on a circuit board, acoustic noise may be generated.

According to the exemplary embodiment, in the composite electronic component 100 including a composite body in which the multilayer ceramic capacitor 120 and the tantalum capacitor 110 are coupled to each other, since the tantalum capacitor 110 and the multilayer ceramic capacitor 120 are disposed to be parallel with each other, the multilayer ceramic capacitor 120 does not directly contact a circuit board when it is mounted on the circuit board. Therefore, acoustic noise may be significantly decreased.

Referring to FIG. 1, in the composite electronic component 100, according to the exemplary embodiment, the tantalum capacitor 110 and the multilayer ceramic capacitor 120 may be electrically connected to each other in parallel. Since the tantalum wire 112, which is an anode part of the tantalum capacitor 110, and the first external electrode 122, which is an anode part of the multilayer ceramic capacitor 120, are connected to each other by the anode lead frame 130, and the tantalum body 111, which is a cathode part of the tantalum capacitor 110, and the second external electrode 123, which is a cathode part of the multilayer ceramic capacitor 120, are connected to each other by the cathode lead frame 140, when power having different polarities (+ or −) are connected to the anode lead frame 130 and the cathode lead frame 140, the tantalum capacitor 110 and the multilayer ceramic capacitor 120 may be connected to each other in parallel.

In addition, there is no need for a separate lead frame, high capacitance may be implemented, low equivalent series resistance (ESR)/equivalent series inductance (ESL) may be implemented, DC-bias characteristics may be improved, and thickness may be reduced.

Since the composite electronic component 100, according to the exemplary embodiment, includes the composite body in which the multilayer ceramic capacitor 120 and the tantalum capacitor 110 are coupled to each other, high equivalent series resistance (ESR), which is a disadvantage of the tantalum capacitor 110, may be decreased. In addition, deterioration of DC-bias characteristics, which is a disadvantage of the multilayer ceramic capacitor 120, may be prevented, and thickness may be decreased. In addition, according to the exemplary embodiment, the multilayer ceramic capacitor 120 generating acoustic noise when it is mounted on a board and the tantalum capacitor 110 not generating acoustic noise when it is mounted on a board are coupled at a predetermined volume ratio, whereby acoustic noise may be significantly decreased.

The composite electronic component 100, according to the exemplary embodiment, may effectively and stably implement the above-mentioned features by improving shapes of the anode lead frame 130 and the cathode lead frame 140 and a manufacturing method thereof.

Hereinafter, the configuration of the composite electronic component 100, according to the exemplary embodiment, will be described.

The sealing part 150 may be formed to enclose the multilayer ceramic capacitor 120 and the tantalum capacitor 110. The sealing part 150 may serve to protect the multilayer ceramic capacitor 120 and the tantalum capacitor 110 from external factors, and may be mainly formed of an epoxy mold compound (EMC) based on epoxy or silicone, or the like. However, a material of the sealing part 150 is not limited thereto.

The composite electronic component 100, according to the exemplary embodiment, may be implemented as a single component in which the multilayer ceramic capacitor 120 and the tantalum capacitor 110 are coupled to each other due to the sealing part 150.

The multilayer ceramic capacitor 120 is not particularly limited, and various multilayer ceramic capacitors 120 may be applied.

For example, the multilayer ceramic capacitor 120 may include the ceramic body 121 in which the plurality of dielectric layers 126 and the internal electrodes 124 and 125 disposed with each of the dielectric layers interposed therebetween are stacked; and the external electrodes 122 and 123 formed on the outer surfaces of the ceramic body 121 to be connected to the internal electrodes 124 and 125. The internal electrodes 124 and 125 may be divided into first and second internal electrodes 124 and 125, wherein the first and second internal electrodes 124 and 125 may be alternately disposed on the dielectric layers 126, with one dielectric layer 126 interposed therebetween. The first internal electrode 124 may be exposed to one side surface of the ceramic body 121 and the second internal electrode 125 may be exposed to a surface of the ceramic body 121 opposing one side surface thereof.

The ceramic body 121 may be formed by stacking the plurality of dielectric layers 126 and the internal electrodes 124 and 125 and then sintering the stacked dielectric layers 126 and internal electrodes 124 and 125.

Further, the dielectric layers 126 may contain ceramic powder having high permittivity such as a barium titanate ($BaTiO_3$) based powder or a strontium titanate ($SrTiO_3$) based powder, or the like. However, a material of the dielectric layer 126 is not limited thereto.

The first and second internal electrodes 124 and 125 may be formed using a conductive paste formed of at least one of, for example, a noble metal material such as palladium (Pd), a palladium-silver (Pd—Ag) alloy, or the like, nickel (Ni), and copper (Cu). However, a material of the first and second internal electrodes 124 and 125 is not particularly limited thereto.

The external electrodes 122 and 123 may be disposed on the outer surfaces of the ceramic body 121 to thereby be electrically connected to the internal electrodes 124 and 125. The external electrodes 122 and 123 may include the first and second external electrodes 122 and 123. The first external electrode 122 may be electrically connected to the first internal electrode 124, and the second external electrode 123 may be electrically connected to the second internal electrode 125.

According to the exemplary embodiment, unlike a general multilayer ceramic capacitor, nickel/tin (Ni/Sn) plating layers may not be disposed on the first and second external electrodes 122 and 123. Since the composite electronic component 100, according to the exemplary embodiment, includes the sealing part 150 enclosing the multilayer ceramic capacitor 120 and the tantalum capacitor 110 as described below, there is no need to form plating layers on the first and second external electrodes 122 and 123 of the multilayer ceramic capacitor 120. Therefore, there is no problem such as reliability deterioration due to infiltration of a plating solution into the ceramic body 121 of the multilayer ceramic capacitor 120.

The tantalum capacitor 110 may include the tantalum body 111 and the tantalum wire 112, and the tantalum wire 112 may be inserted into the tantalum body 111 so that a portion thereof in a length direction thereof is exposed to one surface of the tantalum body 111. The tantalum body 111 of the tantalum capacitor 110 may include an anode body, a dielectric layer, a solid electrolyte layer, a carbon layer, and a cathode layer. The anode body may be formed of a porous sintered body of tantalum powder. The dielectric layer may be formed on a surface of the anode body. The dielectric layer may be formed by oxidation of the surface of the anode body. For example, the dielectric layer may be formed of a dielectric material containing tantalum oxide ($Ta_2O_5$), an oxide of tantalum forming the anode body, and may be formed on the surface of the anode body at a predetermined thickness.

The solid electrolyte layer may be formed on a surface of the dielectric layer. The solid electrolyte layer may contain at least one of a conductive polymer or manganese dioxide ($MnO_2$). In a case in which the solid electrolyte layer is formed of the conductive polymer, the solid electrolyte layer may be formed on the surface of the dielectric layer by a chemical polymerization method or an electro-polymerization method. For the conductive polymer material, a polymer material having conductivity may be used without any particular limitation. For example, the conductive polymer material may contain polypyrrole, polythiophene, polyaniline, or the like.

In a case in which the solid electrolyte layer is formed of manganese dioxide ($MnO_2$), conductive manganese dioxide may be formed on the surface of the dielectric layer by dipping the anode body of which the dielectric layer is formed on the surface in a manganese aqueous solution such as a manganese nitrate aqueous solution and pyrolyzing the manganese aqueous solution.

The carbon layer containing carbon may be disposed on the solid electrolyte layer. The carbon layer may be formed of carbon paste. That is, the carbon layer may be formed by applying the carbon paste obtained by dispersing conductive carbon material powder such as natural graphite, carbon black, or the like, in water or an organic solvent in a state in which the conductive carbon material powder is mixed with a binder, a dispersant, or the like, onto the solid electrolyte layer. The cathode layer containing a conductive metal may be disposed on the carbon layer in order to improve electric connectivity with the cathode lead frame 140, wherein the conductive metal contained in the cathode layer may be silver (Ag).

The tantalum capacitor 110 is not particularly limited. For example, a tantalum capacitor 110 having a structure in which a separate internal lead frame except for the anode lead frame 130 and the cathode lead frame 140 does not exist may be used.

According to the exemplary embodiment, the composite electronic component 100 may include the anode lead frame 130 connected to the tantalum wire 112 of the tantalum capacitor 110 and the first external electrode 122 of the multilayer ceramic capacitor 120, and disposed to be partially exposed to the outside of the sealing part 150, and the cathode lead frame 140 connected to the tantalum body 111 of the tantalum capacitor 110 and the second external electrode 123 of the multilayer ceramic capacitor 120, and disposed to be partially exposed to an outside surface of the sealing part 150.

The anode lead frame 130 and the tantalum wire 112 may be connected to each other by various methods. The anode lead frame 130 and the tantalum wire 112 may be bonded to each other by electric welding. In this case, the composite electronic component 100 may include a welding part. Further, the anode lead frame 130 and the tantalum wire 112 may be bonded to each other by a conductive adhesive.

The anode lead frame 130 may be connected to the first external electrode 122, and the cathode lead frame 140 may be connected to the second external electrode 123 and the tantalum body 111 by separate connection conductors (not illustrated). In this case, the connection conductors may be conductive resin parts formed by curing a conductive resin paste. The conductive resin part may contain conductive particles and a base resin. The conductive particles may be silver (Ag) particles but are not limited thereto, and the base resin may be a thermosetting resin, such as an epoxy resin. In addition, the conductive resin part may contain copper (Cu) as a conductive metal but is not necessarily limited thereto.

The anode lead frame 130 and the cathode lead frame 140 may be connected to the external power source (not illustrated), thereby serving to allow current to pass through the tantalum wire 112, the tantalum body 111, and the first and second external electrodes 122 and 123. That is, the anode lead frame 130 and the cathode lead frame 140 may be exposed to the outside of the sealing part 150 to serve as connection terminals for electric connection with another electronic product.

A case in which the anode lead frame 130 and the cathode lead frame 140 are equally exposed to a lower surface of the sealing part 150 is illustrated in FIGS. 1 through 3. However, a surface of the sealing part 150 to which the anode lead frame 130 and the cathode lead frame 140 are exposed is not limited thereto.

The anode lead frame 130 and the cathode lead frame 140 may be formed by cutting and compressing a thin layer containing at least one of chromium (Cr), titanium (Ti), copper (Cu), nickel (Ni), palladium (Pd), and gold (Au), and may also be formed by dry-sputtering or plating at least one of chromium (Cr), titanium (Ti), copper (Cu), nickel (Ni), palladium (Pd), and gold (Au), or forming and etching a metal layer. However, a formation method of the anode lead frame 130 and the cathode lead frame 140 is not limited thereto.

The tantalum wire 112 may contain a tantalum ingredient, may be inserted into the tantalum body 111 of the tantalum capacitor 110, and may be connected to the external power source through the anode lead frame 130, thereby forming an anode.

According to the exemplary embodiment in the present disclosure, the tantalum wire 112 may be disposed to be led from one surface of the tantalum body 111 of the tantalum capacitor 110 as illustrated in FIG. 1. Alternatively, the tantalum wire 112 may be led from a central portion of the tantalum body 111 or may be disposed to be offset from the central portion of the tantalum body 111. The tantalum wire 112 is disposed to be eccentric toward one portion of the tantalum body 111, and thus it may be easier to secure a mounting area of the multilayer ceramic capacitor 120, and it may be easy to dispose an anode electrode and a cathode electrode.

Figure 4:
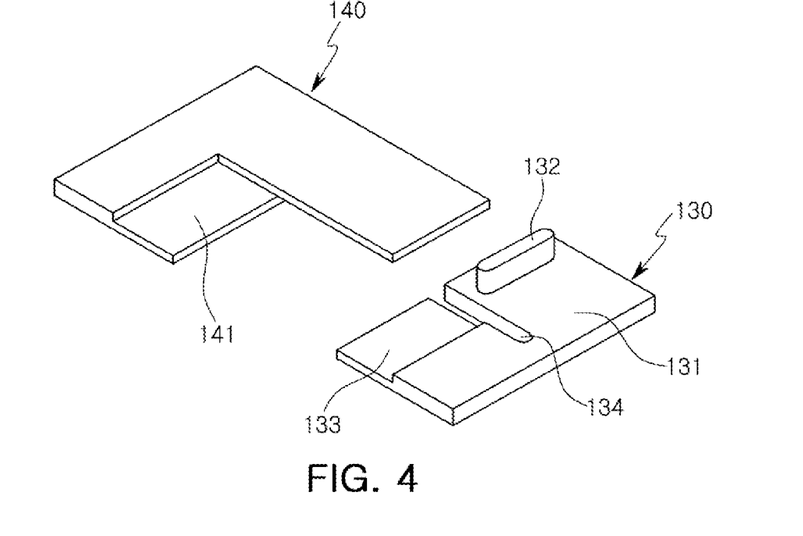
FIGS. 4 and 5 are perspective views illustrating an anode lead frame and a cathode lead frame included in the composite electronic component according to the exemplary embodiment in the present disclosure.
Figure 5:
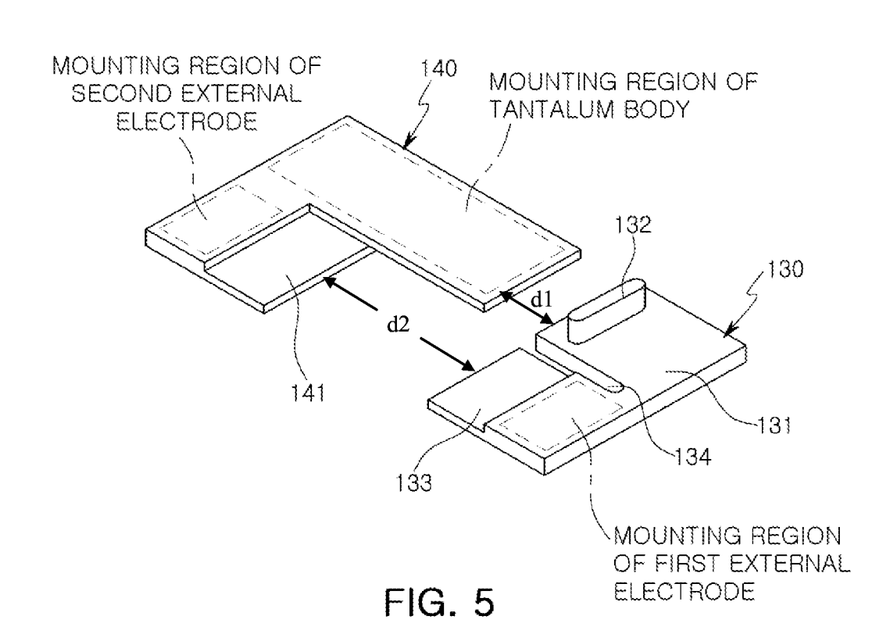

FIGS. 4 and 5 are perspective views illustrating the anode lead frame 130 and the cathode lead frame 140 included in the composite electronic component 100, according to the exemplary embodiment. FIG. 5 illustrates positions of the anode lead frame 130 and the cathode lead frame 140 on which the tantalum capacitor 110 and the multilayer ceramic capacitor 120 are mounted.

Referring to FIGS. 4 and 5, the anode lead frame 130 and the cathode lead frame 140 may include the step portion 133 and the step portion 141, respectively.

The step portion 133 and the step portion 141 may serve to prevent short circuits from occurring due to the electric connection between the ceramic body 121 of the multilayer ceramic capacitor 120 and the anode lead frame 130, and the ceramic body 121 and the cathode lead frame 140.

As illustrated in FIGS. 4 and 5, the step portion 133 may be formed in a portion of the anode lead frame 130 to face a mounted surface of the multilayer ceramic capacitor 120 mounted on the anode lead frame 130, and the step portion 141 may be formed in a portion of the cathode lead frame 140 to face a mounted surface of the multilayer ceramic capacitor 120 mounted on the cathode lead frame 140. That is, in a top view of the anode lead frame 130 and the cathode lead frame 140 on which the tantalum capacitor 110 and the multilayer ceramic capacitor 120 are mounted, the step portion 133 and the step portion 141 may be formed below the multilayer ceramic capacitor 120. Further, unless there are problems in regard to electrical connections between the first external electrode 122 and the anode lead frame 130 and between the second external electrode 123 and the cathode lead frame 140, and in regard to prevention of short circuits with the ceramic capacitor 120, the step portion 133 and the step portion 141 may also be further extended.

The step portion 133 and the step portion 141 may be formed to be stepped downwardly from the mounted multilayer ceramic capacitor 120 so that the anode lead frame 130 and the cathode lead frame 140 do not contact the body of the multilayer ceramic capacitor 120. Therefore, a distance between the ceramic body 121 of the multilayer ceramic capacitor 120 and the anode lead frame 130 and a distance between the ceramic body 121 of the multilayer ceramic capacitor 120 and the cathode lead frame 140 may be increased, and thus short circuits caused by an electrical connection therebetween may be prevented.

In this case, a depth of the step portion 133 with respect to the thickness of an anode electrode plate 131 and a depth of the step portion 141 with respect to the thickness of the cathode lead frame 140 are not particularly limited as long as the short circuits may not occur between the ceramic body 121 of the multilayer ceramic capacitor 120 and the anode lead frame 130 and the cathode lead frame 140 as described above. Further, shapes of the step portion 133 and the step portion 141 are not particularly limited.

The step portions 133, 141, and 142 may be formed by various methods. The step portions 133, 141, and 142 may be formed by compressing the anode lead frame 130 and the cathode lead frame 140 or by a lithography and etching method. However, the formation method thereof is not particularly limited.

Referring to FIGS. 4 and 5, the anode lead frame 130 may further include a groove 134 between a portion of the anode lead frame 130 connected to the tantalum wire 112 and a portion of the anode lead frame 130 connected to the first external electrode 122.

A distance d1 between a portion of the cathode lead frame 140 that overlaps with the tantalum body 111 and a portion of the anode lead frame 130 that overlaps with the tantalum body 111 may be less than a distance d2 between a portion of the cathode lead frame 111 that overlaps with the multilayer ceramic capacitor 120 and a portion of the anode lead frame 130 that overlaps with the multilayer ceramic capacitor 120.

Since the multilayer ceramic capacitor 120 and the tantalum body 111 of the tantalum capacitor 110 are disposed to be close to each other in the composite electronic component 100, according to the exemplary embodiment, there is a need to dispose the multilayer ceramic capacitor 120 and the tantalum capacitor 110 to be spaced apart from each other by a predetermined distance or more in order to isolate the multilayer ceramic capacitor 120 and the tantalum body 111 of the tantalum capacitor 110 from each other.

The groove 134 may be formed in the anode lead frame 130, and thus a mounting position of the multilayer ceramic capacitor 120 may be limited. That is, when the multilayer ceramic capacitor 120 is mounted on the anode lead frame 130, the multilayer ceramic capacitor 120 may be mounted to be spaced apart from the groove 134 in the anode lead frame 130 by a predetermined distance, and thus a problem of the multilayer ceramic capacitor 120 and the tantalum capacitor 110 contacting each other may be prevented.

A shape and a position of the groove 134 are not particularly limited but may be freely changed as long as the object as described above may be satisfied. In addition, although not illustrated, the groove 134 may be formed between a mounting region of the tantalum body 111 and a mounting region of the second external electrode 123 in the cathode lead frame 140 (see FIG. 5). Further, the groove 134 may be formed by various manufacturing methods, such as a cutting method, a compressing method, or an etching method.

Referring to FIGS. 4 and 5, the anode lead frame 130 may include an anode electrode plate 131 partially exposed to the outside of the sealing part 150 and contacting the first external electrode 122, and a connection portion 132 disposed on the anode electrode plate 131 to contact the tantalum wire 112.

Since the tantalum wire 112 is disposed to protrude toward a side surface of the tantalum body 111, the tantalum wire 112 may be disposed to be spaced apart from the outer surface of the sealing part 150 by a predetermined distance. Further, the anode lead frame 130 is required to be connected to the tantalum wire 112 while being exposed to the outside of the sealing part 150. Therefore, the anode lead frame 130 may include the anode electrode plate 131 partially exposed to the outside of the sealing part 150 and contacting the first external electrode 122, and the connection portion 132 may be separately disposed on the anode electrode plate 131, and thus the anode lead frame 130 may be connected to the tantalum wire 112.

The connection portion 132 may contain a conductive material and be formed of the same material as that of the anode lead frame 130. However, the material of the connection portion is not particularly limited. The connection portion 132 may be formed on the anode lead frame 130 by an electrical welding method.

Method of Manufacturing Composite Electronic Component

Hereinafter, a manufacturing method of a composite electronic component 200, according to another exemplary embodiment, will be described.

Figure 6A:
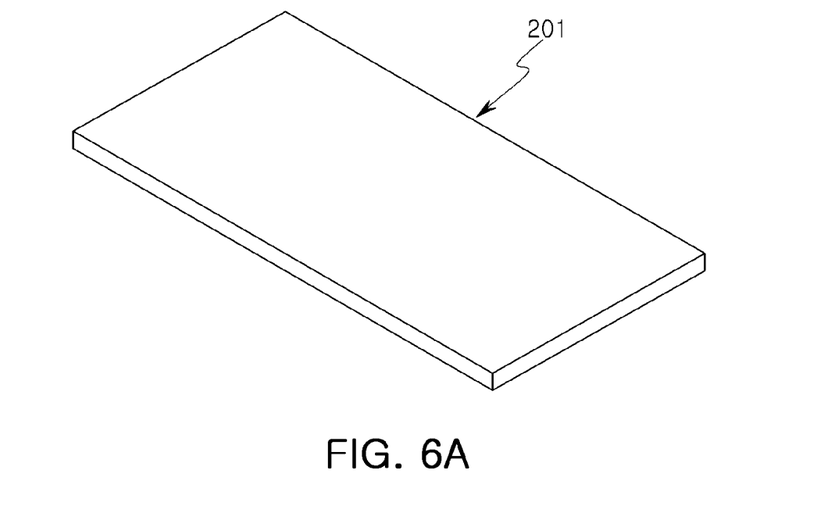
FIGS. 6A through 6E are process views sequentially illustrating a manufacturing method of a composite electronic component according to another exemplary embodiment in the present disclosure.
Figure 6B:
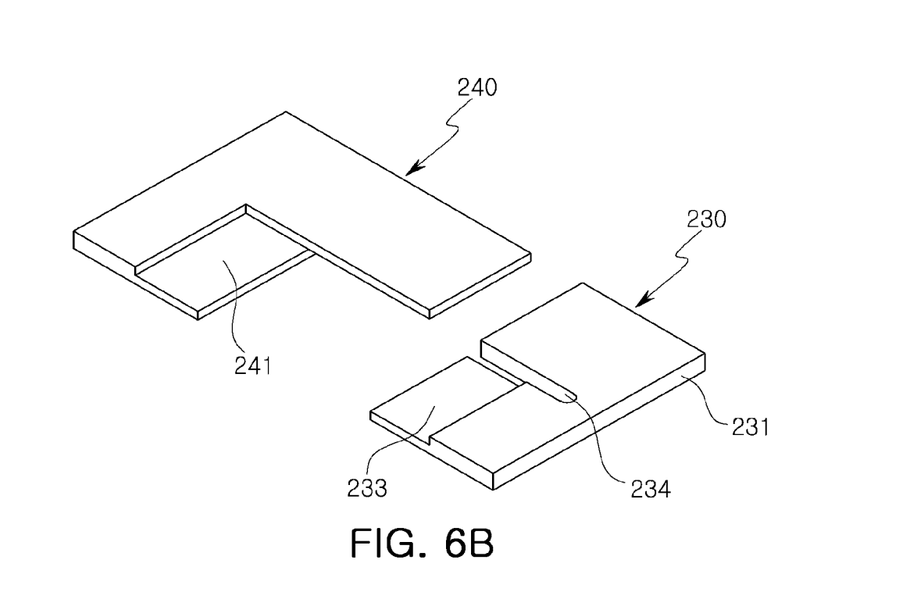
Figure 6C:
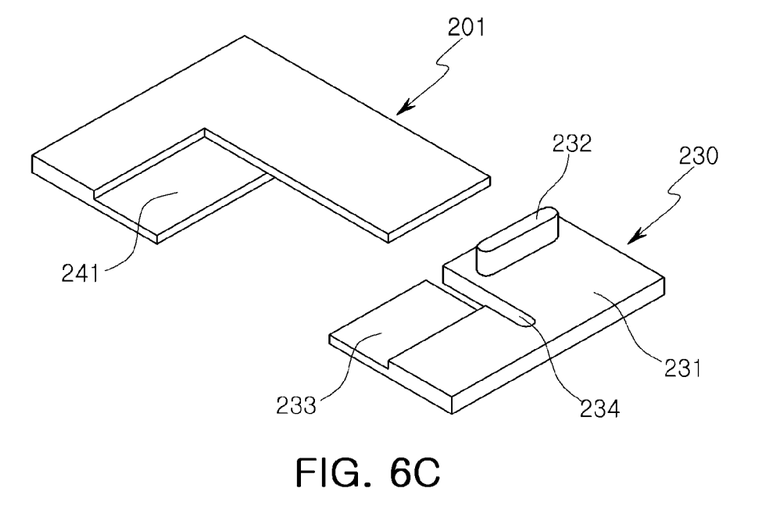
Figure 6D:
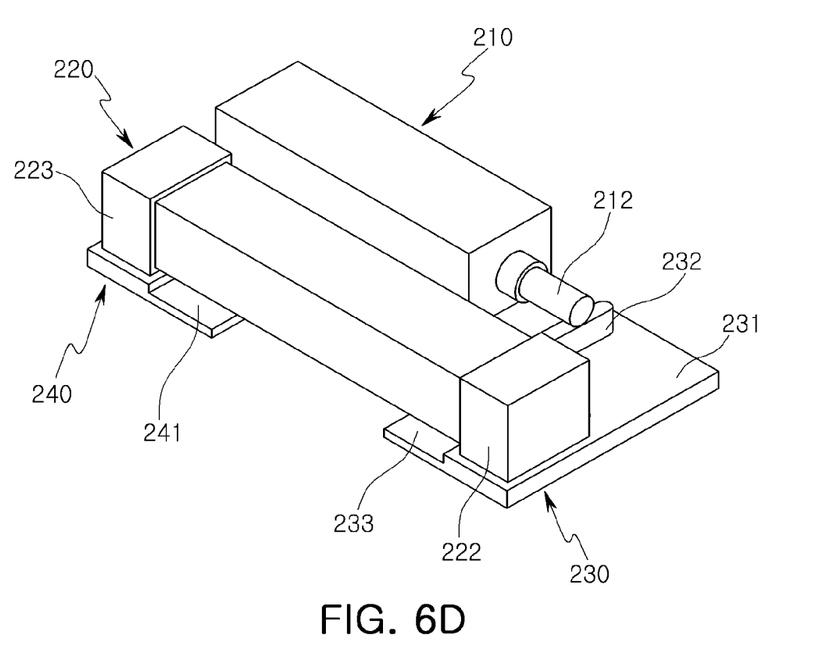
Figure 6E:
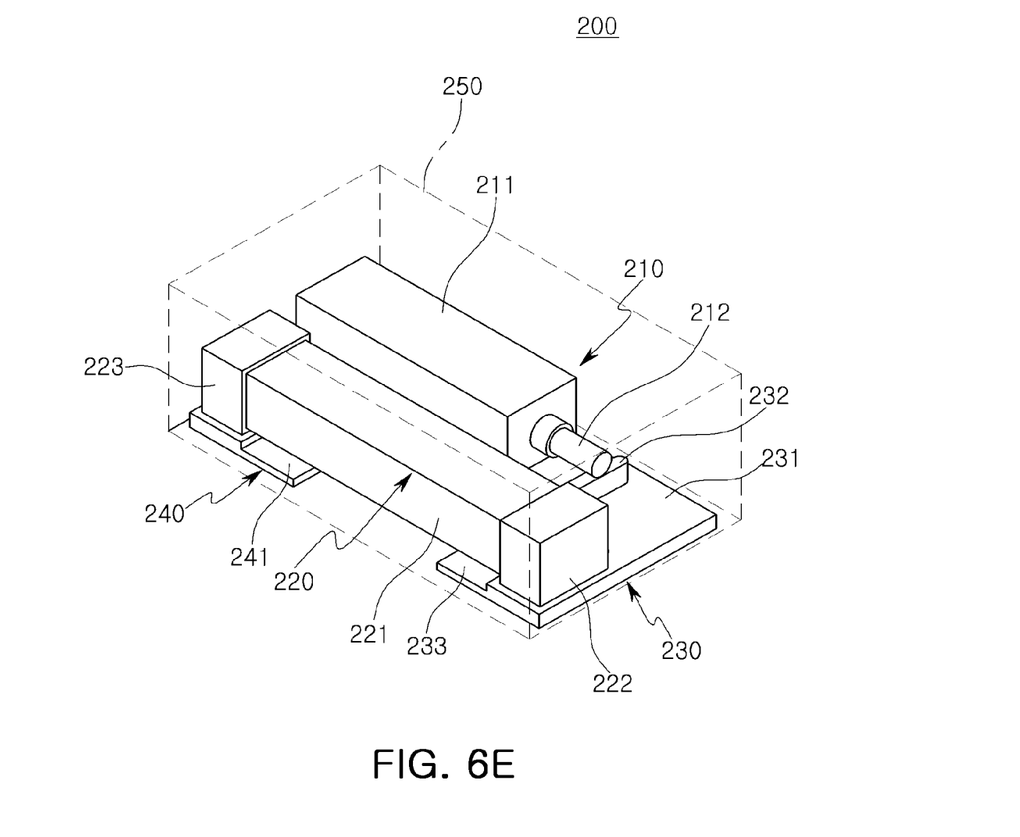
Figure 7:
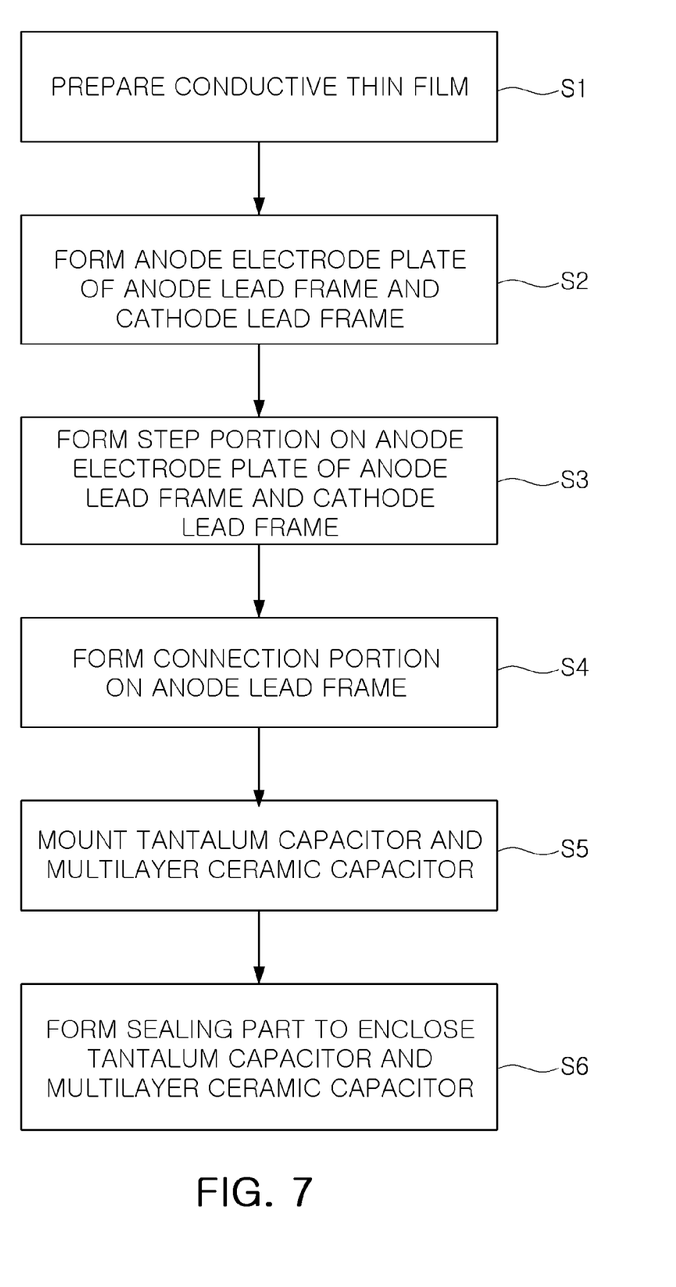
FIG. 7 is a process flowchart of the manufacturing method of a composite electronic component according to another exemplary embodiment in the present disclosure.

FIGS. 6A through 6E are process views sequentially illustrating the manufacturing method of a composite electronic component 200, according to another exemplary embodiment, and FIG. 7 is a process flow chart of the manufacturing method of a composite electronic component 200 according to another exemplary embodiment.

Referring to FIGS. 6A to 7, the manufacturing method of a composite electronic component 200, according to another exemplary embodiment, may include: preparing a conductive thin film 201 (S1); forming an anode electrode plate 231 of an anode lead frame 230 and a cathode lead frame 240 by cutting and compressing the conductive thin film 201 (S2); forming a step portion 233 on the anode electrode plate 231 of the anode lead frame 230 and forming a step portion 241 on the cathode lead frame 240 (S3); forming a connection portion 232 on the anode electrode plate 231 of the anode lead frame 230 (S4); mounting a tantalum capacitor 210 of which a tantalum wire 212 is disposed on one surface of a tantalum body 211 and a multilayer ceramic capacitor 220 including first and second external electrodes 222 and 223 on the anode lead frame 230 and the cathode lead frame 240 (S5); and forming a sealing part 250 to enclose the tantalum capacitor 210 and the multilayer ceramic capacitor 220 while externally exposing one surfaces of the anode lead frame 230 and the cathode lead frame 240.

FIG. 6A illustrates the conductive thin film, which is a material for manufacturing the anode lead frame 230 and the cathode lead frame 240 (S1). A conductive metal such as a nickel/iron alloy, or the like, may be used for the conductive thin film.

Next, the anode electrode plate 231 of the anode lead frame 230 and the cathode lead frame 240 may be formed by cutting and compressing the conductive thin film 201 (S2).

When the conductive thin film 201 is cut, the anode lead frame 230 and the cathode lead frame 240 may be cut at suitable sizes in consideration of sizes of the multilayer ceramic capacitor 220 and the tantalum capacitor 210 to be mounted thereon. In addition, specific shapes for increasing adhesive strength with the tantalum capacitor 210 and the multilayer ceramic capacitor 220 may be formed on mounting surfaces of the anode lead frame 230 and the cathode lead frame 240 by compressing, and shapes for improving strength of the anode lead frame 230 and the cathode lead frame 240 may be formed.

Then, the step portion 233 may be formed on the anode electrode plate 231 of the anode lead frame 230, and the step portion 241 may be formed on the cathode lead frame 240 (S3).

The step portion 233 may be disposed in a portion of the anode lead frame 230 overlapping the multilayer ceramic capacitor 220 based on a surface of the anode lead frame 230 on which the multilayer ceramic capacitor 220 is mounted, and the step portion 241 may be disposed in a portion of the cathode lead frame 240 overlapping the multilayer ceramic capacitor 220 based on a surface of the cathode lead frame 240 on which the multilayer ceramic capacitor 220 is mounted.

The step portion 233 and the step portion 241 may be formed by a compressing method or a lithography and etching method, similar to the forming of the anode electrode plate 231 of the anode lead frame 230 and the cathode lead frame 240 as described above.

In a case in which the step portion 233 and the step portion 241 are formed by the compressing method, the step portion 233 and the step portion 241 may be formed simultaneously with cutting and compressing the conductive thin film 201 in order to form the anode electrode plate 231 of the anode lead frame 230 and the cathode lead frame 240. As described above, the anode electrode plate 231 of the anode lead frame 230, the cathode lead frame 240, the step portion 233, and the step portion 241 may be simultaneously formed, and thus the process may be simplified and manufacturing costs may be decreased.

Further, any one of the forming of the anode electrode plate 231 of the anode lead frame 230 and the cathode lead frame 240 by cutting and compressing the conductive thin film 201 (S2) and the forming of the step portion 231 on the anode electrode plate 231 of the anode lead frame 230 and the step portion 241 on the cathode lead frame 240 (S3) may further include forming a groove 234 between a portion of the anode lead frame 230 connected to the tantalum wire 212 and a portion of the anode lead frame 230 connected to the first external electrode 222.

Since the groove 234 may be formed by a cutting and compressing method or an etching method, the groove 234 may be formed when the anode electrode plate 231 of the anode lead frame 230 and the cathode lead frame 240 are formed by cutting and compressing or when the step portion 233 and the step portion 241 are formed by compressing or etching. In addition, the anode electrode plate 231 of the anode lead frame 230, the cathode lead frame 240, the step portion 233, the step portion 241, and the groove 234 may be simultaneously formed.

FIG. 6B illustrates shapes of the anode electrode plate 231 of the anode lead frame 230, the cathode lead frame 240, the step portion 233, the step portion 241, and the groove 234.

Next, as illustrated in FIG. 6C, the connection portion 232 may be formed on the anode electrode plate 231 of the anode lead frame 230 (S4). The connection portion 232 containing a conductive material may be separately manufactured or purchased, and then, bonded onto the anode electrode plate 231 of the anode lead frame 230 by an electrical welding method or using a conductive adhesive.

Then, as illustrated in FIG. 6D, the tantalum capacitor 210 of which the tantalum wire 212 is disposed on one surface of the tantalum body 211 and the multilayer ceramic capacitor 220 including the first and second external electrodes 222 and 223 may be mounted on the anode lead frame 230 and the cathode lead frame 240 (S5).

The tantalum body 211 may be mounted on one surface of the cathode lead frame 240, the tantalum wire 212 may be mounted on the connection portion 232, the first external electrode may be mounted on one surface of the anode electrode plate of the anode lead frame, and the second external electrode 223 may be mounted on one surface of the cathode lead frame 240.

In order to mount the tantalum capacitor 210 and the multilayer ceramic capacitor 220, the anode lead frame 230 and the cathode lead frame 240 may be disposed to be parallel to each other so that the anode lead frame 230 and the cathode lead frame 240 face each other. In this case, if necessary, heat resistant tape may be attached to lower surfaces of the anode and cathode lead frames 230 and 240 to connect them to each other. The heat resistant tape is used to prevent surfaces of the anode and cathode lead frames 230 and 240 from being contaminated during the subsequent molding.

Adhesive strength between the anode lead frame 230 and the multilayer ceramic capacitor 220, the cathode lead frame 240 and the multilayer ceramic capacitor 220, and the cathode lead frame 240 and the tantalum capacitor 220 may be improved by applying a conductive adhesive on mounting portions of the anode lead frame 230 and the cathode lead frame 240 in advance before mounting the tantalum capacitor 210 and the multilayer ceramic capacitor 220 to form conductive adhesive layers (not illustrated) having a predetermined thickness. Thereafter, in order to cure the conductive adhesive layers as described above, curing at about 200° C. may be performed.

In this case, the tantalum capacitor 210 and the multilayer ceramic capacitor 220 may be mounted on positions which are determined in relation to the groove 234 formed in the anode lead frame 230. The multilayer ceramic capacitor 220 and the tantalum capacitor 210 may be mounted to be spaced apart from each other by a predetermined distance based on the groove 234 formed in the anode lead frame 230, and thus contact between the multilayer ceramic capacitor 220 and the tantalum capacitor 210 may be prevented.

Thereafter, as illustrated in FIG. 6E, the sealing part 250 may be formed to enclose the tantalum capacitor 210 and the multilayer ceramic capacitor 220 while externally exposing one surfaces of the anode lead frame 230 and the cathode lead frame 240 (S6).

The sealing part 250 may serve to protect and insulate the tantalum capacitor 210 and the multilayer ceramic capacitor 220 from external factors.

When formation of the sealing part 250 is completed, the heat resistant tape attached to the lower surfaces of the anode lead frame 230 and the cathode lead frame 240 may be removed.

The composite electronic component 200, according to another exemplary embodiment, may be manufactured by the above-mentioned process.

As set forth above, according to exemplary embodiments in the present disclosure, the composite electronic component having significantly decreased acoustic noise and having low equivalent series resistance (ESR)/equivalent series inductance (ESL), improved DC-bias characteristics, and reduced thickness may be efficiently and stably provided.

While exemplary embodiments have been shown and described above, it will be apparent to those skilled in the art that modifications and variations could be made without departing from the scope of the present invention as defined by the appended claims.

What is claimed is:
1. A composite electronic component comprising:
a tantalum capacitor including a tantalum body containing sintered tantalum powder and a tantalum wire disposed on one surface of the tantalum body;
a multilayer ceramic capacitor including a ceramic body in which a plurality of dielectric layers and internal electrodes are alternately disposed, and first and second external electrodes disposed on outer surfaces of the ceramic body;
a sealing part enclosing the tantalum capacitor and the multilayer ceramic capacitor;
an anode lead frame connected to the tantalum wire of the tantalum capacitor and the first external electrode of the multilayer ceramic capacitor, and exposed to the outside of the sealing part; and
a cathode lead frame connected to the tantalum body of the tantalum capacitor and the second external electrode of the multilayer ceramic capacitor, and exposed to the outside of the sealing part,
wherein the anode lead frame includes a first step portion that does not contact the first external electrode of the multilayer ceramic capacitor,
the cathode lead frame includes a second step portion that does not contact the second external electrode of the multilayer ceramic capacitor, and
a distance between a portion of the cathode lead frame that overlaps with the tantalum body and a portion of the anode lead frame that overlaps with the tantalum body is less than a distance between a portion of the cathode lead frame that overlaps with the multilayer ceramic capacitor and a portion of the anode lead frame that overlaps with the multilayer ceramic capacitor.

2. The composite electronic component of claim 1, wherein the first and second step portions of the anode and cathode lead frames are disposed below a mounted surface of the multilayer ceramic capacitor mounted on the anode and cathode lead frames.

3. The composite electronic component of claim 1, wherein the anode lead frame further includes a groove between a portion of the anode lead frame connected to the tantalum wire and a portion of the anode lead frame connected to the first external electrode.

4. The composite electronic component of claim 1, wherein the anode lead frame and the cathode lead frame are exposed to the same surface of the sealing part.

5. The composite electronic component of claim 1, wherein the anode lead frame includes:
   an anode electrode plate partially exposed to the outside of the sealing part and contacting the first external electrode; and
   a connection portion disposed on the anode electrode plate to contact the tantalum wire.

6. The composite electronic component of claim 1, wherein the tantalum capacitor and the multilayer ceramic capacitor are electrically connected to each other in parallel.

7. The composite electronic component of claim 1, wherein the cathode lead frame includes a third step portion formed in a surface opposite to a mounted surface of the multilayer ceramic capacitor, and the third step portion and the tantalum body overlap with each other.

\* \* \* \* \*